March 25, 1952 — L. E. RASCH — 2,590,461
FISH LURE
Filed Dec. 31, 1948
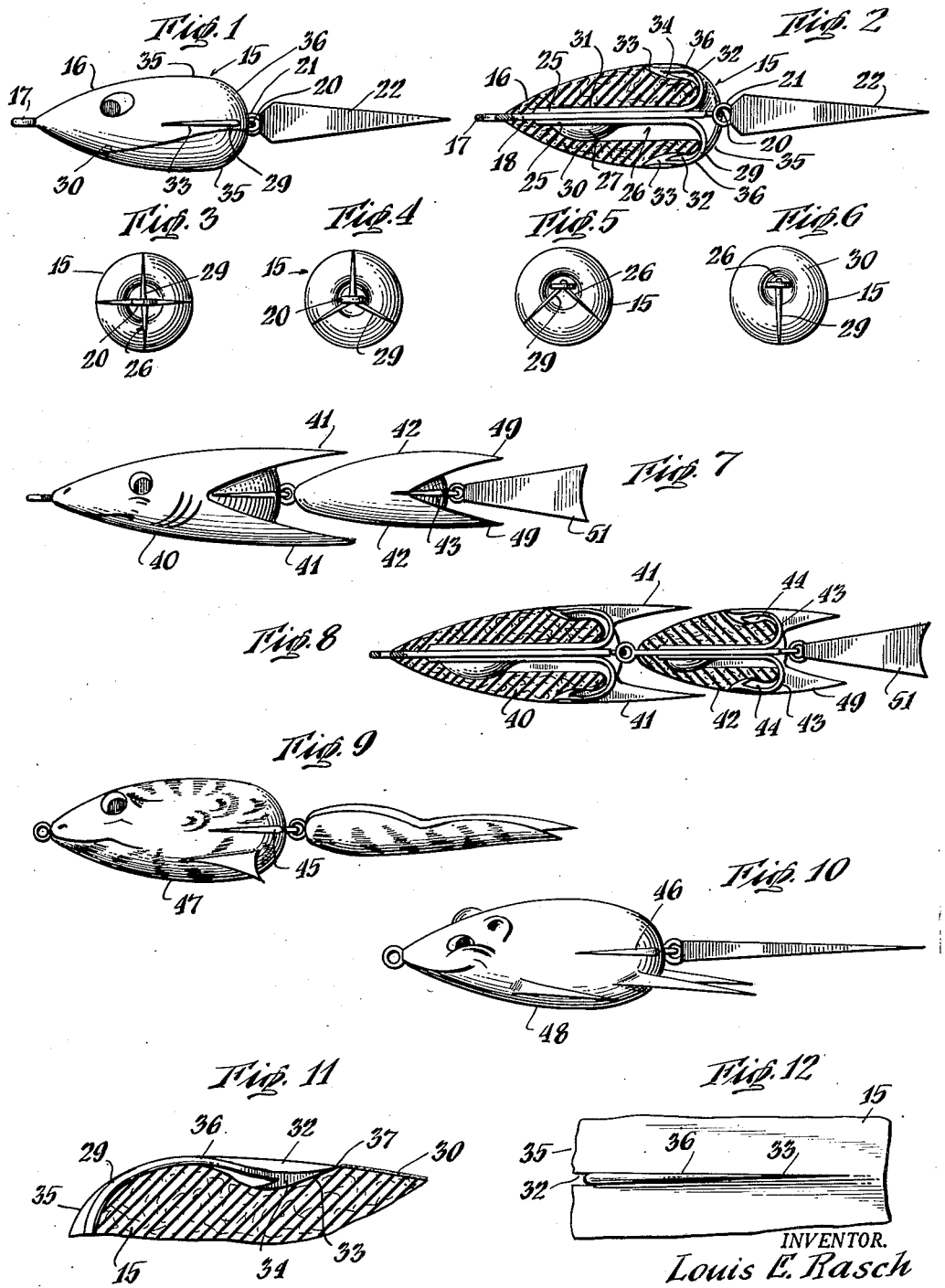
INVENTOR.
Louis E. Rasch
BY Frank A. Bower
ATTORNEY Patented Mar. 25, 1952

2,590,461

UNITED STATES PATENT OFFICE 2,590,461

FISH LURE

Louis E. Rasch, Brainerd, Minn.

Application December 31, 1948, Serial No. 68,649

2 Claims. (Cl. 43—42.15)

This invention relates to fish lures and particularly to those adapted for use in waters where there are weeds, rushes, lily-pads or the like tending to become entangled with the hook barbs. The object of the invention is to provide a lure which will be attractive to the fish and feel natural in its mouth and which will carry the hook secure against entanglement with surrounding plants while at the same time positioning it to surely catch within the mouth of the fish at the instant of the strike.

A further object of the invention is to form the lure of yielding material, soft and pliable, and adapted to closely simulate the appearance of live bait and to be held rather than thrown by the striking fish.

Further objects of the invention in the particular simulation of various types of bait and the weighting and balancing of the lure to act naturally as it is cast or trawled will appear from the following description taken in connection with the accompanying drawings in which Fig. 1 is a side view of a lure illustrating one embodiment of the invention;

Fig. 2 is a longitudinal sectional view of the lure shown in Fig. 1;

Figs. 3, 4, 5 and 6 are rear views of the body of the lure shown in Figs. 1 and 2;

Fig. 7 is a side view of another form of lure;

Fig. 8 is a longitudinal sectional view of the lure shown in Fig. 7;

Figs. 9 and 10 are side views of still further modified designs of lures illustrating the invention;

Fig. 11 is a sectional view of a lure body and hook end on an enlarged scale; and Fig. 12 is a plan view of the details shown in Fig. 11.

In the specific embodiment of the invention shown in Figs. 1 to 6, the body 15 of the lure has the head portion 16 terminating in eyelet 17 in the front of the shank 18, the other end of which carries the eyelet 20 linked with the eyelet 21 of the tail 22. Preferably the eyelets 17, 20 are horizontal in upright position of the lure while tail eyelet 21 is vertical to give a natural movement between the body and tail parts in the water. Fixed to shank 18 are the shafts 25 of hooks 26 and also the flat balance weight 27 so that all the metal parts from leader eye 17 to tail eye 20 form one complete unit.

Surrounding and embedding the shank 18 and hooks 26 is the body 15 of light, resilient material such as sponge rubber of a density which combined with the metal parts will give the proper casting weight to the lure.

The bends 29 of the hooks 26 have points 33 at their ends and each entire hook is contained within the body 15 being set in a corresponding groove therein. The substance of the body is, for instance, of yielding sponge rubber colored and coated with a flexible plastic coating 30 and is formed with a central bore 31 sized and shaped to snugly receive the shank 18 and shafts 25 of the hooks and the balance weight 27 which tends to maintain the lure upright. At its rear end the bore 31 branches into narrow shallow grooves or indentations 32, one for each hook and conforming closely to the shape and thickness of the hook bend 29 and point 33 and barb 34 and the rear surface 35 of the body 15 curves around to tangency with the outer portions of the hook bends at 36 positioning the barbed ends of the hooks just within the periphery of the body 15 and not overlaid by any material.

In striking the lure the fish grasps the complete body 15 in its mouth and the soft pliability of the material simulates the natural minnow, chub or the like so closely that the fish will hold it instead of throwing it. Then instantaneously the hook points catch as the lure is seized and held in the fish's mouth.

The appearance of the lure may be made to simulate desired and most effective forms of bait such as a chub, frog, crawfish, mouse or minnow. The metal parts as a unit may be inserted in place from the rear being pressed into the "bore" and grooves to the position shown in Figs. 1 and 2 and with the tail carried by the rear eyelet. As shown by the rear views of Figs. 3, 4, 5 and 6, any desired number of hooks may be employed, the body 15 being correspondingly modified and the balance adjusted for each change in the number of hooks or in the design employed.

In all designs the contour of the soft body is closely tangential to the hook ends and the material of the body, while shedding weeds, leaves, rushes and the like, offers practically no resistance to the bite of the fish. In fact, as above noted, it so closely imitates the appearance and feel of the live bait as to insure a full grasping strike by the fish.

At the same time it is fully effective to guard the hooks against catching on stems, lily pads, weeds and the like and actual tests have demonstrated it to be weedless even where there is an abundance of plants. The body shape is self-sustaining and the surface shape simulating that of an aquatic organism is naturally streamlined to slip through the water and obstructions.

An important feature is the housing of the point 33 and barb 34 of the hook, for instance, as illustrated in Figs. 11 and 12 showing the groove 32 housing the bend and point of the hook protectively against weeds and the like but not against the compressing grasp of the fish's jaws. The plastic covered walls of the groove 32 provide a tapered closely fitting housing engaging the inner surfaces of the bend 29 and barb 34 but preferably not covering the outer surfaces of the hook end to any substantial extent. This interengagement maintains these parts in place against accidental shifting and avoids overlap of the hook ends by the material of the body in a manner which would interfere with the quick penetration of the fish's mouth by the hook barb and point.

As the lure material is compressed by engagement with the fish's mouth the tip 37 of the point 33 lying right at the surface is instantaneously unsheated and as it catches hold tends to continue its penetration and push back any adjacent material of the body 15. At the same time the generally backward trend of the material functions to clear it from the rearwardly directed barb 34; thus given the prompt action of the tip 37 of the hook end, the full piercing of the fish's mouth parts is assured.

In the embodiment of the invention shown in Figs. 1 to 6 the tail 22, usually flat and of rubber and shaped to complete the simulation of the live bait, is hookless, the body hooks 26 being depended on for the catch. The body 15 is also shown as finless, giving a very compact and simple contour.

In the modification shown in Figs. 7 and 8 the main body 40 has fins 41 and the second body portion 42 pivoted to the body 40 is also provided with fins 49 and hooks 43 similarly housed in grooves 44 so that upon missing the body 40 the fish is still likely to be caught by these additional hooks 43. A separate tail 51 is pivoted to the second body portion 42 as shown giving a double flexibility to the lure.

Figs. 9 and 10 show further modifications of the lure using the hooks 45, 46 embedded respectively in bodies 47 and 48 and illustrating how the principle of the invention is applicable to differing simulations of live baits. In all of these the general structure of the parts is substantially as set forth in the intimate combination of the interior metal structure and the embedding light resilient material.

The material of the lure should be sponge rubber, rubber foam or of like resilient cellular formation and may be molded or cast to desired shape. Such material while permanently self-supporting is soft and locally compressible whenever contacted and has only a very thin surface coating 30 of plastic easily punctured by the teeth of the fish and closely simulating the skin covering of the live bait in its feel and response when struck. An instance of such composition is Rubatex providing a very fine distribution of air cells in a rubber-like material moldable to any desired shape.

The lure may be widely varied in shape and size and peripherally contoured to conform to any desired form of hook and the invention is not confined to the specific embodiments shown and described but is intended to include such modifications thereof as fall within the scope of the appended claims.

I claim:

1. A fish lure comprising a body portion consisting of a unitary mass of light uniformly compressible cellular rubber formation throughout having a smooth peripheral surface expanding from a front center point to a maximum diameter toward the rear to simulate bait and adapted to readily yield to the grasp of a fish's jaws and provided with a central bore and a groove formation having at least one narrow longitudinal groove extending radially from said central bore to said surface, a metal hook and shank assembly having the shank portion positioned in said bore and the hook portion contained entirely between the longitudinal surfaces of said groove formation so that said hook and shank assembly is insertable in said body by forward movement from the rear into bore and groove formation into position to guard the hook portion against catching on weeds, rushes and the like, said groove formation having a portion corresponding in shape and width to the hook formation between the shank and point thereof to curve around from rearward to forward between the hook point and shank.

2. A fish lure comprising a body portion consisting of a unitary integral mass of light uniformly compressible cellular rubber formation throughout having a smooth peripheral surface expanding from a front center point to a maximum diameter toward the rear beyond the midpoint to simulate bait and adapted to readily yield to the grasp of a fish's jaws and provided with a central bore and a groove formation having at least one narrow longitudinal groove extending radially from said central bore to said surface, a metal hook and shank assembly having the shank portion positioned in said bore and the hook portion contained entirely between the longitudinal surfaces of said groove formation so that said hook and shank assembly is insertable in said body by forward movement from the rear into bore and groove formation into position to guard the hook portion against catching on weeds, rushes and the like, and a tapered solid strip tail piece attached to the shank and hook assembly at the rear end thereof by separate pivoting adjacent the terminal groove formation of the body of the lure.

LOUIS E. RASCH.

REFERENCES CITED

The following references are of record in the file of this patent:

UNITED STATES PATENTS

| Number | Name | Date |
| --- | --- | --- |
| 570,632 | Hastings | Nov. 3, 1896 |
| 994,927 | Jefferson | June 13, 1911 |
| 1,508,111 | Meyer | Sept. 9, 1924 |
| 1,713,041 | Fey | May 14, 1929 |
| 1,846,538 | Albens et al. | Feb. 23, 1932 |
| 1,993,018 | Pfeifle | Mar. 5, 1935 |
| 1,994,672 | Davenport | Mar. 19, 1935 |
| 2,191,244 | Wise | Feb. 20, 1940 |
| 2,214,360 | Woodley | Sept. 10, 1940 |
| 2,306,181 | Neumann | Dec. 22, 1942 |
| 2,476,733 | Jacobs | July 19, 1949 |

FOREIGN PATENTS

| Number | Country | Date |
| --- | --- | --- |
| 25,169 | Great Britain | Nov. 23, 1908 |